(12) United States Patent
MacKerron et al.

(10) Patent No.: US 8,591,998 B2
(45) Date of Patent: Nov. 26, 2013

(54) MANUFACTURING PROCESS FOR POLYESTER FILM EXHIBITING LOW THERMAL SHRINKAGE

(75) Inventors: Duncan Henry MacKerron, Middlesbrough (GB); Katsuyuki Hashimoto, Anpachi-gun (JP)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 811 days.

(21) Appl. No.: 12/278,820

(22) PCT Filed: Feb. 9, 2007

(86) PCT No.: PCT/GB2007/000471
§ 371 (c)(1),
(2), (4) Date: Apr. 7, 2010

(87) PCT Pub. No.: WO2007/091090
PCT Pub. Date: Aug. 16, 2007

(65) Prior Publication Data
US 2010/0189998 A1 Jul. 29, 2010

(30) Foreign Application Priority Data
Feb. 9, 2006 (GB) .................................. 0602678.5

(51) Int. Cl.
| | | |
|---|---|---|
| *B05D 3/02* | (2006.01) |
| *B32B 27/08* | (2006.01) |
| *B32B 27/18* | (2006.01) |
| *B32B 27/20* | (2006.01) |
| *B32B 27/24* | (2006.01) |
| *B32B 27/30* | (2006.01) |
| *B32B 27/36* | (2006.01) |
| *B32B 37/02* | (2006.01) |
| *B32B 38/00* | (2006.01) |

(52) U.S. Cl.
USPC ........ 427/387; 427/331; 427/372.2; 427/384; 427/385.5; 427/393.5; 427/397.7; 427/397.8; 428/446; 428/447; 428/480; 428/483; 428/334; 428/335; 428/336; 264/288.4; 264/290.2

(58) Field of Classification Search
None
See application file for complete search history.

(56) References Cited

U.S. PATENT DOCUMENTS

| | | | |
|---|---|---|---|
| 3,443,950 A | 5/1969 | Rawlins, Jr. | |
| 3,504,075 A * | 3/1970 | Jenks et al. | ................. 264/175 |
| 3,708,225 A | 1/1973 | Misch et al. | |

(Continued)

FOREIGN PATENT DOCUMENTS

| | | |
|---|---|---|
| CN | 1476460 A | 2/2004 |
| CN | 1497340 A | 5/2004 |

(Continued)

OTHER PUBLICATIONS

Examination Report mailed Jul. 29, 2011, 4 pages.

(Continued)

*Primary Examiner* — Vivian Chen
(74) *Attorney, Agent, or Firm* — RatnerPrestia

(57) ABSTRACT

A process in which a wound roll of biaxially oriented polyester film having a glass transition temperature (Tg (° C.)) is annealed at a temperature $T_a$ (° C.) above Tg where $Tg<T_a\leq Tg+100$ (° C.) for a time t after thermal equilibrium where 1 hour$\leq t\leq$72 hours and cooled, for the purpose of improving the shrinkage of said polyester film.

20 Claims, 5 Drawing Sheets

(56) References Cited

U.S. PATENT DOCUMENTS

| | | | | |
|---|---|---|---|---|
| 3,873,664 | A * | 3/1975 | Curtis et al. | 264/146 |
| 3,986,997 | A | 10/1976 | Clark | |
| 4,141,735 | A * | 2/1979 | Schrader et al. | 430/141 |
| 4,177,315 | A * | 12/1979 | Ubersax | 428/336 |
| 4,198,465 | A | 4/1980 | Moore et al. | |
| 4,309,319 | A | 1/1982 | Vaughn, Jr. | |
| 4,310,600 | A | 1/1982 | Cross | |
| 4,436,851 | A | 3/1984 | Vaughn, Jr. | |
| 4,455,205 | A | 6/1984 | Olson et al. | |
| 4,725,479 | A * | 2/1988 | Utsumi | 428/209 |
| 4,847,033 | A * | 7/1989 | Carroll, Jr. | 264/346 |
| 4,994,214 | A * | 2/1991 | Stevens et al. | 264/476 |
| 5,021,091 | A * | 6/1991 | Takarada et al. | 106/287.16 |
| 5,053,481 | A * | 10/1991 | Ishii et al. | 528/206 |
| 5,240,532 | A | 8/1993 | Yu | |
| 5,538,831 | A | 7/1996 | Oshima et al. | |
| 5,545,364 | A | 8/1996 | Song et al. | |
| 5,567,576 | A * | 10/1996 | Suzuki et al. | 430/533 |
| 5,725,960 | A * | 3/1998 | Konishi et al. | 428/451 |
| 5,895,212 | A * | 4/1999 | Fujikura et al. | 432/59 |
| 5,910,356 | A * | 6/1999 | Ishikawa et al. | 428/215 |
| 5,914,220 | A * | 6/1999 | Murayama | 430/349 |
| 6,017,212 | A | 1/2000 | Fujikura et al. | |
| 6,020,056 | A | 2/2000 | Walker et al. | |
| 6,054,224 | A | 4/2000 | Nagai et al. | |
| 6,071,682 | A | 6/2000 | Greener et al. | |
| 6,129,980 | A * | 10/2000 | Tsukada et al. | 428/327 |
| 6,132,951 | A * | 10/2000 | Ezure et al. | 430/627 |
| 6,139,952 | A * | 10/2000 | Furuya et al. | 428/339 |
| 6,171,758 | B1 * | 1/2001 | Bhateja et al. | 430/271.1 |
| 6,198,217 | B1 | 3/2001 | Suzuki et al. | |
| 6,228,499 | B1 * | 5/2001 | Nakauchi et al. | 428/412 |
| 6,303,228 | B1 | 10/2001 | Watanabe et al. | |
| 6,355,345 | B1 * | 3/2002 | Furuya et al. | 428/343 |
| 6,355,703 | B1 * | 3/2002 | Baba et al. | 522/182 |
| 6,358,601 | B1 * | 3/2002 | Bilkadi | 428/323 |
| 6,376,060 | B1 * | 4/2002 | Yoshihara et al. | 428/323 |
| 6,749,982 | B2 | 6/2004 | Rao et al. | |
| 6,787,236 | B2 * | 9/2004 | Kimura et al. | 428/412 |
| 6,841,272 | B2 * | 1/2005 | Shoshi et al. | 428/697 |
| 6,926,945 | B2 * | 8/2005 | Yano et al. | 428/141 |
| 6,942,831 | B2 * | 9/2005 | Greener et al. | 264/346 |
| 7,022,388 | B2 * | 4/2006 | Hashimoto et al. | 428/34.9 |
| 7,101,627 | B2 * | 9/2006 | MacDonald et al. | 428/480 |
| 7,173,778 | B2 * | 2/2007 | Jing et al. | 359/810 |
| 7,264,866 | B2 * | 9/2007 | Hashimoto et al. | 428/212 |
| 7,468,197 | B2 * | 12/2008 | Kurita et al. | 427/177 |
| 7,524,920 | B2 * | 4/2009 | Pecorini et al. | 528/272 |
| 2004/0081839 | A1 | 4/2004 | Kubo et al. | |
| 2004/0247916 | A1 * | 12/2004 | MacDonald et al. | 428/523 |

FOREIGN PATENT DOCUMENTS

| | | | |
|---|---|---|---|
| CN | 1659248 A | | 8/2005 |
| DE | 4025613 | | 2/1991 |
| EP | 0408197 | | 1/1991 |
| EP | 0429179 | | 5/1991 |
| EP | 0604079 | | 6/1994 |
| EP | 0951991 | | 10/1999 |
| EP | 1418197 | | 5/2004 |
| EP | 1452309 | | 9/2004 |
| JP | 54068880 | | 6/1979 |
| JP | 61164814 | | 7/1986 |
| JP | 62127229 | | 6/1987 |
| JP | 62149415 | | 7/1987 |
| JP | 02-158633 | * | 6/1990 |
| JP | 06-067346 | * | 3/1994 |
| JP | 09-204005 | * | 8/1997 |
| JP | 2004-066642 A | | 3/2004 |
| JP | 2004-099755 | * | 4/2004 |
| WO | WO 01/07508 | | 2/2001 |
| WO | WO 03/022575 | | 3/2003 |
| WO | WO03/087247 | | 10/2003 |
| WO | WO2005/012403 | | 2/2005 |

OTHER PUBLICATIONS

GB0602678.5; The Patent Office Search Report; Jun. 1, 2006; UK; 1 p.

GB0602678.5; The Patent Office Search Report; Dec. 5, 2006; UK; 1 p.

* cited by examiner

MANUFACTURING PROCESS FOR POLYESTER FILM EXHIBITING LOW THERMAL SHRINKAGE

This application is a National Stage filing of PCT Application No. GB2007/000471, filed 9 Feb. 2007, which claims priority benefit of GB Application No. 0602678.5, filed 9 Feb. 2006, the entirety of which is incorporated herein by reference.

FIELD OF THE INVENTION

The present invention relates to polyester films which exhibit exceptionally low thermal shrinkage, and to low cost processes which by post-treatment of polyester film can improve its thermal shrinkage behaviour, to make it more suitable in applications such as electronic, photonic and optical assemblies or structures. In such applications, dimensional stability of a flexible film base is critical to maintain register between electro-active layers applied successively during manufacture and to ensure reliable performance.

BACKGROUND OF THE INVENTION

Polyester film continues to find new applications as stand-alone film or as a component in more complicated systems and devices. Its ability to satisfy the requirements of new applications lies in the perpetual modification and improvement of its properties, usually achieved through changes to its chemical character or its physical microstructure. The latter is linked intimately to its process or manufacturing history.

In many high added-value applications, a key property of polyester film is its dimensional stability, aspects of which can be characterized in terms of a number of different parameters, including the coefficient of linear thermal expansion (CLTE), the coefficient of linear hygroscopic expansion (CLHE) and the irreversible strain memory or "thermal shrinkage". The invention discussed hereinbelow focuses on the thermal shrinkage behaviour of polyester film and in particular on achieving ultra low shrinkage through a low-cost treatment process.

The most common type of commercial film made from polyester has always exhibited an irreversible dimensional change at elevated temperatures, that is a permanent shrinkage or (under certain circumstances) expansion. This feature is a legacy of the manufacturing technology, which usually involves a stretching or drawing stage in one or two directions to enhance other properties such as strength, stiffness and toughness. The microscopic cause of the dimensional instability is relatively well understood and is attributed to the extension and alignment of segments of the polymer molecules which reside in non crystallized regions of the polyester material. Upon heating above the glass transition of the film, the molecular chains within the amorphous fraction of the film acquire sufficient rotational, vibrational and translational mobility to retract towards a more random, equilibrium conformation. On the macroscopic level, the film contracts physically. When expansion is observed, it is usually in a direction perpendicular to a large shrinkage and reflects a Poisson effect.

The change in dimension as a result of heat can be a few percent, however this value can be increased or reduced by a number of factors. For example if the manufacturing process can enable a physical relaxation of the film by a few percent during production it can almost entirely remove residual shrinkage in that direction. However while normal TD relaxation or "toe-in" is easily performed, continuous film processes operate with a finite line tension. Consequently in the most common form of commercial film manufacturing technology, MD relaxation is only partly achieved and a residual MD shrinkage of the film will manifest upon reheating.

A solution to this is offered by the biaxial stenter technology, which has the ability to apply strain relaxation in both the TD and MD. However the technology represents a high capital investment and data indicate that finite tensions still exist, leading to albeit small residual shrinkage. Alternative routes to allow relaxation under conditions of controlled temperature and tension or speed have also been developed, as online and offline post treatments. These post stenter relaxation treatments also operate at reduced line tension, but still cannot eliminate entirely the thermal shrinkage of polyester film, measured in the process direction.

The ideal conditions for thermal relaxation, which will remove all residual shrinkage behaviour in polyester film must allow for unrestrained or stress-free relaxation of the web. This is confirmed by a disclosure in JP-A-62/149415 which claims the benefits of annealing polyester film under such conditions, although the procedure comprised simply annealing small sheets of biaxial film in an oven over a temperature range of 150 to 220° C. The limitation to this batch process is that the stabilized film could not supply any downstream "roll to roll" processing.

The current situation is therefore that high costs are incurred to achieve the ultimate improvement in thermal shrinkage and in practice a balance is often reached between the cost of manufacturing stabilized polyester film, and its properties. However recalling that continuous improvement is a prerequisite to access new applications and new markets, there is a clear requirement for a low cost process that produces polyester film having ultra low thermal shrinkage in both its process and transverse directions.

A further technology, which is often employed to provide dimensional stabilization in polyester film is roll annealing, as disclosed in, for instance U.S. Pat. No. 4,141,735 and U.S. Pat. No. 6,071,682. In this approach, a roll of polyester film is heated from ambient temperature to a second elevated temperature, held under these conditions for a period of time and finally cooled. Care must be taken over the physical quality of the reel, the thermal gradient established as a result of heating and cooling and any other sources that may generate local regions of stress in the roll during treatment. However, this procedure is only claimed for low temperature annealing. In particular, temperatures below the glass transition temperature (Tg) of the polyester film are specified and optimally between 15 and 20° C. below this Tg. The treatment is known as "below-Tg annealing" (BTA) and is designed to improve the specific property of core set curl (CSC) in polyester film when it is subsequently wound and retained in final use, around a spindle of small diameter. The BTA process is a low cost, post-manufacturing treatment. The treatment exploits a fundamental behaviour of polymers often described as enthalpy relaxation which results in densification of disordered molecular chains and increased resistance to CSC. The thermal treatment is reversible if the polymeric film is reheated above its Tg. These factors; the optimum temperature range below Tg, the fundamental molecular process and its reversibility, and the macroscopic property and application of interest, make the BTA technology distinctly different to thermal stabilisation aimed at improving shrinkage behaviour.

The object of the present invention is to provide a low shrinkage polyester film, optionally also exhibiting good optical properties, and a process for the production thereof.

SUMMARY OF THE INVENTION

The present invention provides a process in which a wound roll of biaxially oriented polyester film having a glass transition temperature (Tg (° C.)) is annealed at a temperature $T_a$ (° C.) above Tg where Tg<$T_a$≤Tg+100 (° C.) for a time t after thermal equilibrium where 1 hour≤t≤72 hours and cooled.

The present invention further provides the use of a process in which a wound roll of biaxially oriented polyester film having a glass transition temperature (Tg (° C.)) is annealed at a temperature $T_a$ (° C.) above Tg where Tg<$T_a$≤Tg+100 (° C.) for a time t after thermal equilibrium where 1 hour≤t≤72 hours and cooled, for the purpose of improving the shrinkage of said polyester film.

The present invention further provides a method of improving the shrinkage of biaxially oriented polyester film having a glass transition temperature (Tg (° C.)), said method comprising the steps of annealing a wound roll of said film at a temperature $T_a$ (° C.) above Tg where Tg<$T_a$≤Tg+100 (° C.) for a time t after thermal equilibrium where 1 hour≤t≤72 hours, and then cooling.

Preferably, the time t is such that 1 hour≤t≤48 hours, and more typically 1 hour≤t≤24 hours.

The annealing process of the invention is conducted on the roll of film when in the wound state.

The present invention further provides a wound roll of biaxially oriented polyester film which exhibits dimensional change in both its machine (or process or longitudinal direction) (MD) and its transverse direction (TD) after heating to 180° C. for 30 minutes of less than or equal to 0.08%, more preferably less than or equal to 0.05% and most preferably less than or equal to 0.03%. The wound roll of film having said dimensional stability characteristics is a roll-annealed wound roll of film produced by the roll-annealing process described herein, i.e. wherein the annealing process is conducted on the wound roll of film.

DETAILED DESCRIPTION OF THE INVENTION

Figure 1:
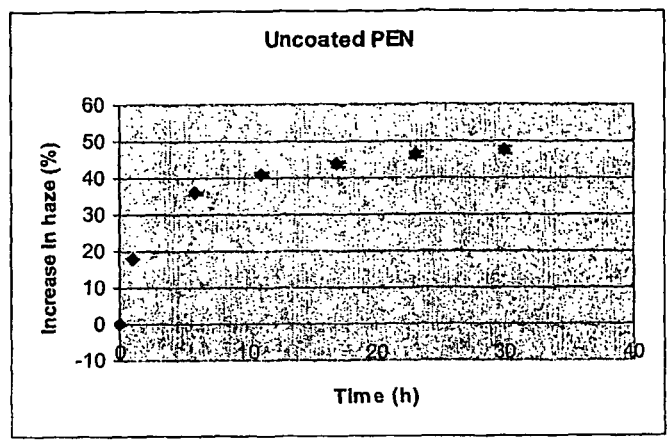
FIGS. 1 and 2 are graphs showing haze increase as a function of annealing time for uncoated PEN and PET films, respectively.

The present invention exploits a combination of physical and thermal conditions which have not previously been recognized as suitable to impart dimensional stabilization to polyester film. We have shown that is it possible to develop and apply the principle of reel annealing to the problem of thermal shrinkage of polyester film. Unlike BTA, the treatment is irreversible and therefore shows benefit at temperatures above the Tg of the polyester film, and even at shrinkage test temperatures in excess of those of the annealing procedure. Moreover the annealing treatment is additive, in that it can successfully post-treat film which has been either manufactured in a conventional way, or manufactured and stabilized using existing technology. We can now therefore improve the properties of any manufactured polyester film which exhibits a small residual thermal shrinkage. An advantage of the present invention is its low cost.

The inventors have found unexpectedly that polyester films, even if they already exhibit good thermal dimensional stability (low thermal shrinkage), can be further treated by annealing above the Tg of the polyester film while retained in the form of a continuous roll. Moreover, resultant film rolls are free from blocking (sticking) and exhibit further improved thermal shrinkage behaviour, making them most suitable for applications in the electronic and opto-electronic areas and other uses where ultra-low thermal shrinkage is required.

The invention includes the treatment of a roll of biaxially oriented composite film which comprises one or more coatings on a supporting polyester substrate. A drawback of high temperature annealing processes is the production of cyclic oligomers within the film, which can migrate to, and contaminate, the film surface, causing the film to become hazy. The inventors have unexpectedly found that the presence of a coating, and preferably the hard-coating compositions referred to hereinbelow, reduces the level of haze induced by the high-temperature annealing of the wound roll. The hardcoat composition may also be useful to reduce or avoid sticking (or blocking) in the winding and unwinding of an annealed roll of film.

The present invention therefore further provides a wound roll of biaxially oriented composite film comprising a polyester substrate supporting one or more coatings on one or both surfaces of said substrate, wherein said film exhibits a dimensional change in both its MD and its TD after heating to 180° C. for 30 minutes of less than or equal to 0.08%, preferably less than or equal to 0.05% and most preferably less than or equal to 0.03%, and which preferably also exhibits a haze value of no more than 1.5% and/or a total luminance transmission (TLT) of at least 85%. The wound roll of composite film having said dimensional stability characteristics is a roll-annealed wound roll of composite film produced by the roll-annealing process described herein, i.e. wherein the annealing process is conducted on the wound roll of composite film. In one embodiment, the coating is present on both sides of the polyester substrate.

Thus, if a combination of low shrinkage and excellent optical properties (i.e. low haze and/or high TLT) are required, the hardcoated and annealed composite films described herein represent an unexpectedly advantageous solution. The hardcoat is optional for applications where only low shrinkage is required and haze is unimportant.

Annealing Process

The process equipment comprises an annealing oven of appropriate dimensions to house one or several rolls of polyester film whose size(s) range from laboratory to commercial scale. The oven is preferably of the circulating air design capable of providing an accurate and programmable control of internal air temperature, and in any case able to ensure a consistent and evenly distributed transfer of heat to every point on the surface of each roll. The operating temperature range of the annealing oven should be from ambient to at least Tg+60° C., more preferably Tg+80° C. and most preferably Tg+100° C., where Tg refers to the glass transition of the polyester film (or polyester substrate where coating(s) is/are present on the substrate surface).

Film Material to be Treated

The term polyester as used herein includes a polyester homopolymer in its simplest form or modified, chemically and/or physically. In particular, the material to be treated by the annealing process is a biaxially oriented polymeric film comprising a layer of polyester or copolyester derived from:
  (i) one or more diol(s);
  (ii) one or more aromatic dicarboxylic acid(s); and
  (iii) optionally, one or more aliphatic dicarboxylic acid(s) of the general formula $C_nH_{2n}(COOH)_2$ wherein n is 2 to 8, wherein the aromatic dicarboxylic acid is present in the (co)polyester in an amount of from about 80 to about 100 mole % based on the total amount of dicarboxylic acid components in the (co)polyester. A copolyester may be a random, alternating or block copolyester.

The thickness of the film is preferably from about 12 to about 250 µm, more preferably from about 12 to about 150 µm, and typically is about 25-125 µm in thickness.

The polyester is obtainable by condensing said dicarboxylic acids or their lower alkyl (up to 6 carbon atoms) diesters with one or more diols. The aromatic dicarboxylic acid is preferably selected from terephthalic acid, isophathalic acid, phthalic acid, 2,5-, 2,6- or 2,7-naphthalenedicarboxylic acid, and is preferably terephthalic acid or 2,6-naphthalenedicarboxylic acid, preferably 2,6-naphthalenedicarboxylic acid. The diol is preferably selected from aliphatic and cycloaliphatic glycols, e.g. ethylene glycol, 1,3-propanediol, 1,4-butanediol, neopentyl glycol and 1,4-cyclohexanedimethanol, preferably from aliphatic glycols. Preferably the copolyester contains only one glycol, preferably ethylene glycol. The aliphatic dicarboxylic acid may be succinic acid, glutaric acid, adipic acid, pimelic acid, suberic acid, azeleic acid or sebacic acid. Preferred homopolyesters are polyesters of 2,6-naphthalenedicarboxylic acid or terephthalic acid with ethylene glycol. A particularly preferred homopolyester is poly(ethylene naphthalate), and particularly polyesters of 2,6-naphthalenedicarboxylic acid with ethylene glycol.

Formation of the polyester is conveniently effected in a known manner by condensation or ester interchange, generally at temperatures up to about 295° C.

The Tg of a preferred homopolyester, PEN, is generally acknowledged to be 120° C., while that of the other preferred homopolyester, PET, is generally acknowledged to be 80° C. Copolyesters can exhibit Tg values either below or above those of the parent homopolymer depending on the nature of the comonomer which is incorporated. A film made from the polyester may exhibit Tg values higher than that of the polyester raw material, depending on the crystallinity of the film. Thus, as the crystallinity of the film increases, the polyester chains in the amorphous regions of the film become more restricted in their movement, meaning that the glass transition is observed at higher temperatures. For the avoidance of doubt, the annealing temperature ($T_a$) of the process of the present invention is dependent on the Tg of the polyester film, rather than the polyester raw material.

Formation of the film may be effected by conventional techniques well-known in the art. Conveniently, formation of the film is effected by extrusion, in accordance with the procedure described below. In general terms the process comprises the steps of extruding a layer of molten polymer, quenching the extrudate and orienting the quenched extrudate in at least one direction.

The film is biaxially-oriented. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. Typically, stretching is effected at temperatures higher than the Tg of the polyester, preferably about 15° C. higher than the Tg. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional support at a temperature above the glass transition temperature of the polyester but below the melting temperature thereof, to induce crystallisation of the polyester. During the heat-setting, a small amount of dimensional relaxation may be performed in the transverse direction, TD by a procedure known as "toe-in". Toe-in can involve dimensional shrinkage of the order 2 to 4% but an analogous dimensional relaxation in the process or machine direction, MD is difficult to achieve since low line tensions are required and film control and winding becomes problematic. The actual heat-set temperature and time will vary depending on the composition of the film and its desired final thermal shrinkage but should not be selected so as to substantially degrade the toughness properties of the film such as tear resistance. Within these constraints, a heat set temperature of about 180° to 245° C. is generally desirable.

The film may also, and indeed preferably is, further stabilized through use of an online relaxation stage. In this additional step, the film is heated at a temperature lower than that of the heat-setting stage, and with a much reduced MD and TD tension. Alternatively the relaxation treatment can be performed off-line. Film thus processed will exhibit a smaller thermal shrinkage than that produced in the absence of such post heat-setting, relaxation.

The film may conveniently contain any of the additives conventionally employed in the manufacture of polyester films. Thus, agents such as cross-linking agents, dyes, pigments, voiding agents, lubricants, anti-oxidants, radical scavengers, UV absorbers, thermal stabilisers, flame retardants and inhibitors, anti-blocking agents, surface active agents, slip aids, optical brighteners, gloss improvers, prodegradents, viscosity modifiers and dispersion stabilisers may be incorporated as appropriate. In one embodiment, additives are selected from those which are known not to migrate out of the film to its surface, so that the additive will not contaminate the surface of the film during annealing by producing surface haze and so agents such as cross-linking agents, pigments, and voiding agents, agents such as anti-oxidants, radical scavengers, UV absorbers, thermal stabilisers, flame retardants and inhibitors, which are solid, or bound covalently to the polyester and finally agents which are stable, non-migrating optical brighteners, gloss improvers, prodegradents, viscosity modifiers and dispersion stabilisers may be incorporated as appropriate. The film may comprise a particulate filler which can improve handling and windability during manufacture. The particulate filler may, for example, be a particulate inorganic filler (e.g. voiding or non-voiding metal or metalloid oxides, such as alumina, silica and titania, calcined china clay and alkaline metal salts, such as the carbonates and sulphates of calcium and barium), or an incompatible resin filler (e.g. polyamides and olefin polymers, particularly a homo- or co-polymer of a mono-alpha-olefin containing up to 6 carbon atoms in its molecule) or a mixture of two or more such fillers.

The components of the composition of a layer may be mixed together in a conventional manner. For example, by mixing with the monomeric reactants from which the film-forming polyester is derived, or the components may be mixed with the polyester by tumble or dry blending or by compounding in an extruder, followed by cooling and, usually, comminution into granules or chips. Masterbatching technology may also be employed.

In a preferred embodiment, the film is optically clear, preferably having a % of scattered visible light (haze) of <10%, preferably <6%, more preferably <3.5% and particularly <1.5%, measured according to the standard ASTM D 1003. In this embodiment, filler is typically present in only small amounts, generally not exceeding 0.5% and preferably less than 0.2% by weight of a given layer.

In an alternative embodiment, the film is opaque and highly filled, preferably exhibiting a Transmission Optical Density (TOD) (Sakura Densitometer; type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. The film is conveniently rendered opaque by incorporation into the polymer blend of an effective amount of an opacifying agent. Suitable opacifying agents include an incompatible resin filler, a particulate inorganic filler or a mixture of two or more such fillers, as hereinbefore described. The amount of filler present in a given layer is preferably in the range from 1% to 30%, more preferably 3% to 20%, particularly 4% to 15%, and especially 5% to 10% by weight, based on the weight of the layer polymer. The surface of an opaque film preferably exhibits a whiteness index, measured as herein described, in the range from 60 to 120, more preferably 80 to 110, particularly 90 to 105, and especially 95 to 100 units.

One or both surfaces of the polyester film may have disposed thereon one or more further polymeric layers or coating materials. Any coating is preferably performed in-line.

In a preferred embodiment, a polyester substrate has on one or both surfaces thereof a hardcoat or scratch resistant layer and optionally a primer layer (such as that disclosed in U.S. Pat. No. 3,443,950) between the film and the hardcoat. The hardcoat layer provides a degree of mechanical protection to the film, as judged for example by the Taber abraser test (ASTM Method D-1044) with percent haze on the samples determined by ASTM Method D-1003. The Taber Abrasion test will typically cause controlled damage to the surface of unprotected film such that under the standard conditions of treatment, the haze of the film is seen to increase by 40-50%. The use of a hardcoat resists the deterioration of the film surface under similar conditions and results in an increase in measured haze of the material of preferably no more than 20%, more preferably no more than 10% and most preferably no more than 5%. A further function of the hardcoat layer may be to provide a flat, planarised surface to the substrate film whose natural surface roughness may vary as a function of inorganic filler particles present in its composition. Suitable hardcoat layers which also impart a planarized character to the film surface fall broadly into one of the three following classifications; organic, organic/inorganic hybrid and predominantly inorganic coats.

Organic hard and planarizing coatings typically comprise (i) a photoinitiator, (ii) a low molecular weight reactive diluent (e.g a monomeric acrylate), (iii) an unsaturated oligomer (e.g. acrylates, urethane acrylates, polyether acrylates, epoxy acrylates or polyester acrylates) and (iv) a solvent. As used herein, the term "low molecular weight" describes a polymerisable monomeric species. The term "reactive" signifies the polymerisability of the monomeric species. Such organic coatings can be cured by free radical reaction, initiated by a photolytic route. Specific formulations may vary according to the desired final properties. In one embodiment, the coating composition comprises a UV-curable mixture of monomeric and oligomeric acrylates (preferably comprising methyl-methacrylate and ethylacrylate) in a solvent (such as methylethylketone), typically wherein the coating composition comprises the acrylates at about 20 to 30 wt % solids of the total weight of the composition, and further comprising a minor amount (e.g. about 1% by weight of the solids) of photoinitiator (e.g. Irgacure™ 2959; Ciba).

Organic/inorganic hybrid coatings comprise inorganic particles distributed throughout an organic polymeric matrix, which can contain component(s) similar to those described immediately above. The coatings are cured either thermally or by free radical reaction initiated by a photolytic route, and the presence of a photoinitiator is optional. The inorganic phase which is often silica or metal oxide particles is dispersed in the polymerisable organic matrix by a number of strategies. In one embodiment, an organic/inorganic hybrid coating comprises inorganic particles preferably selected from silica and metal oxides; and an organic component comprising a low molecular weight reactive component (e.g. monomeric acrylates) and/or an unsaturated oligomeric component (e.g. acrylates, urethane acrylates, polyether acrylates, epoxy acrylates and polyester acrylates); and a solvent, and optionally further comprising a photoinitiator. In a further embodiment, a thermally-curable hybrid coating comprises an epoxy resin in combination with inorganic (preferably silica) particles which are preferably present at a concentration of at least about 10% (preferably at least about 20%, and preferably no more than about 75%) by weight of the solids of the coating composition (which preferably comprises from 5 to about 20% by weight total solids in alcoholic solution). In a further embodiment, a UV-curable hybrid coating composition comprises monomeric acrylates (typically multi-functional acrylates) in combination with inorganic (preferably silica) particles in a solvent (such as methylethylketone), typically wherein the coating composition comprises the acrylates and silica at about 5 to 50 wt % solids of the total weight of the coating composition, and typically further comprising a minor amount (e.g. about 1% by weight of the solids) of photoinitiator. Multi-functional monomeric acrylates are known in the art, and examples include dipentaerythritol tetraacrylate and tris(2-acryloyloxyethyl) iso cyanurate.

A predominantly inorganic hardcoat comprises inorganic particles which are contained in a polymerisable predominantly inorganic matrix such as a polysiloxane. This type of hardcoat is cured thermally.

Suitable examples of a hardcoat and planarizing layer are disclosed in, for instance, U.S. Pat. No. 4,198,465, U.S. Pat. No. 3,708,225, U.S. Pat. No. 4,177,315, U.S. Pat. No. 4,309,319, U.S. Pat. No. 4,436,851, U.S. Pat. No. 4,455,205, U.S. Pat. No. 0,142,362, WO-A-03/087247 and EP 1418197 the disclosures of which are incorporated herein by reference.

If present, the coating should preferably have a Tg which is above the temperature of the annealing process.

In one embodiment, the hardcoat is derived from a coating composition comprising:

(a) from about 5 to about 50 weight percent solids, the solids comprising from about 10 to about 70 weight percent (preferably from about 20 to 60 wt %) silica and from about 90 to about 30 weight percent of a partially polymerized organic silanol of the general formula $RSi(OH)_3$, wherein R is selected from methyl and up to about 40% of a group selected from the group consisting of vinyl, phenyl, gamma-glycidoxypropyl, and gamma-methacryloxypropyl, and (b) from about 95 to about 50 weight percent solvent, the solvent comprising from about 10 to about 90 weight percent water and from about 90 to about 10 weight percent lower aliphatic alcohol, particularly wherein the coating composition has a pH of from about 3.0 to about 8.0, preferably from about 3.0 to about 6.5, preferably less than 6.2, preferably about 6.0 or less, and preferably at least 3.5, preferably at least 4.0.

The silica component of the preferred coating composition may be obtained, for example, by the hydrolysis of tetraethyl orthosilicate to form polysilicic acid. The hydrolysis can be carried out using conventional procedures, for example, by the addition of an aliphatic alcohol and an acid. Alternatively, the silica used in the instant coating compositions can be colloidal silica. The colloidal silica should generally have a particle size of about from 5-25 nm, and preferably about from 7-15 nm. Typical colloidal silicas which can be used in the instant invention include those commercially available as "Ludox SM", "Ludox HS-30" and "Ludox LS" dispersions (Grace Davison). The organic silanol component has the general formula $RSi(OH)_3$. At least about 60% of the R groups, and preferably about from 80% to 100% of these groups, are methyl. Up to about 40% of the R groups can be higher alkyl or aryl selected from vinyl, phenyl, gamma-glycidoxypropyl, and gamma-methacryloxypropyl. The solvent component generally comprises a mixture of water and one or more lower aliphatic alcohols. The water generally comprises about from 10 to 90 weight percent of the solvent, while the lower aliphatic alcohol complementarily comprises about from 90 to 10 weight percent. The aliphatic alcohols generally are those having from 1 to 4 carbon atoms, such as methanol, ethanol, n-propanol, iso-propanol, n-butanol, sec-butanol and tertiary butanol.

In a further embodiment, the coating composition comprises a cross-linkable organic polymer, for instance a polyethylene imine (PEI), polyester or polvinylalcohol (PVOH), and a cross-linking agent (such as Cymel™ 385 or those referred to hereinbelow), in a solvent (typically an aqueous solvent). In this embodiment, the coating composition preferably comprises PEI (preferably with a molecular weight (Mw) in the range 600,000 to 900,000).

The coating compositions can be applied using conventional coating techniques, including continuous as well as dip coating procedures. The coatings are generally applied at a dry thickness of from about 1 to about 20 microns, preferably from about 2 to 10 microns, and particularly from about 3 to about 10 microns. The coating composition can be applied either "off-line" as a process step distinct from the film manufacture, or "in-line" as a continuation of the film manufacturing process. The coating compositions, after application to the substrate, can be cured at a temperature of from about 20 to about 200° C., preferably from about 20 to about 150° C. While ambient temperatures of 20° C. require cure times of several days, elevated temperatures of 150° C. will cure the coatings in several seconds.

The exposed surface of the film may, if desired, be subjected to a chemical or physical surface-modifying treatment to improve the bond between that surface and a subsequently applied layer. A preferred treatment, because of its simplicity and effectiveness, is to subject the exposed surface of the film to a high voltage electrical stress accompanied by corona discharge. The preferred treatment by corona discharge may be effected in air at atmospheric pressure with conventional equipment using a high frequency, high voltage generator, preferably having a power output of from 1 to 20 kW at a potential of 1 to 100 kV. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

As noted above, the polyester substrate may be coated with a primer layer prior to application of the afore-mentioned coating, in order to improve adhesion of the substrate to the afore-mentioned coating composition. A primer layer may be any suitable adhesion-promoting polymeric composition known in the art, including polyester and acrylic resins. The primer composition may also be a mixture of a polyester resin with an acrylic resin. Acrylic resins may optionally comprise oxazoline groups and polyalkylene oxide chains. The polymer(s) of the primer composition is/are preferably water-soluble or water-dispersible.

Polyester primer components include those obtained from the following dicarboxylic acids and diols. Suitable di-acids include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, a dimer acid, and 5-sodium sulfoisophthalic acid. A copolyester using two or more dicarboxylic acid components is preferred. The polyester may optionally contain a minor amount of an unsaturated di-acid component such as maleic acid or itaconic acid or a small amount of a hydroxycarboxylic acid component such as p-hydroxybenzoic acid. Suitable diols include ethylene glycol, 1,4-butanediol, diethylene glycol, dipropylene glycol, 1,6-hexanediol, 1,4-cyclohexanedimethylol, xylene glycol, dimethylolpropane, poly(ethylene oxide) glycol, and poly(tetramethylene oxide) glycol. The glass transition point of the polyester is preferably 40 to 100° C., further preferably 60 to 80° C. Suitable polyesters include copolyesters of PET or PEN with relatively minor amounts of one or more other dicarboxylic acid comonomers, particularly aromatic di-acids such as isophthalic acid and sodium sulphoisophthalic acid, and optionally relatively minor amounts of one or more glycols other than ethylene glycol, such as diethylene glycol.

In one embodiment, the primer layer comprises an acrylate or methacrylate polymer resin. The acrylic resin may comprise one or more other comonomers. Suitable comonomers include alkyl acrylates, alkyl methacrylates (where the alkyl group is preferably methyl, ethyl, n-propyl, isopropyl, n-butyl, isobutyl, t-butyl, 2-ethylhexyl, cyclohexyl or the like); hydroxy-containing monomers such as 2-hydroxyethyl acrylate, 2-hydroxyethyl methacrylate, 2-hydroxypropyl acrylate, and 2-hydroxypropyl methacrylate; epoxy group-containing monomers such as glycidyl acrylate, glycidyl methacrylate, and allyl glycidyl ether; carboxyl group or its salt-containing monomers, such as acrylic acid, methacrylic acid, itaconic acid, maleic acid, fumaric acid, crotonic acid, styrenesulfonic acid and their salts (sodium salt, potassium salt, ammonium salt, quaternary amine salt or the like); amide group-containing monomers such as acrylamide, methacrylamide, an N-alkylacrylamide, an N-alkylmethacrylamide, an N,N-dialkylacrylamide, an N,N-dialkyl methacrylate (where the alkyl group is preferably selected from those described above), an N-alkoxyacrylamide, an N-alkoxymethacrylamide, an N,N-dialkoxyacrylamide, an N,N-dialkoxymethacrylamide (the alkoxy group is preferably methoxy, ethoxy, butoxy, isobutoxy or the like), acryloylmorpholine, N-methylolacrylamide, N-methylolmethacrylamide, N-phenylacrylamide, and N-phenylmethacrylamide; acid anhydrides such as maleic anhydride and itaconic anhydride; vinyl isocyanate, allyl isocyanate, styrene, α-methylstyrene, vinyl methyl ether, vinyl ethyl ether, a vinyltrialkoxysilane, a monoalkyl maleate, a monoalkyl fumarate, a monoalkyl itaconate, acrylonitrile, methacrylonitrile, vinylidene chloride, ethylene, propylene, vinyl chloride, vinyl acetate, and butadiene. In a preferred embodiment, the acrylic resin is copolymerised with one or more monomer(s) containing oxazoline groups and polyalkylene oxide chains. The oxazoline group-containing monomer includes 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-methyl-2-oxazoline. One or more comonomers may be used. 2-Isopropenyl-2-oxazoline is preferred. The polyalkylene oxide chain-containing monomer includes a monomer obtained by adding a polyalkylene oxide to the ester portion of acrylic acid or methacrylic acid. The polyalkylene oxide chain includes polymethylene oxide, polyethylene oxide, polypropylene oxide, and polybutylene oxide. It is preferable that the repeating units of the polyalkylene oxide chain are 3 to 100.

Where the primer composition comprises a mixture of polyester and acrylic components, particularly an acrylic resin comprising oxazoline groups and polyalkylene oxide chains, it is preferable that the content of the polyester is 5 to 95% by weight, preferably 50 to 90% by weight, and the content of the acrylic resin is 5 to 90% by weight, preferably 10 to 50% by weight.

Other suitable acrylic resins include:

(i) a copolymer of (a) 35 to 40 mole % alkyl acrylate, (b) 35 to 40% alkyl methacrylate, (c) 10 to 15 mole % of a comonomer containing a free carboxyl group such as itaconic acid, and (d) 15 to 20 mole % of an aromatic sulphonic acid and/or salt thereof such as p-styrene sulphonic acid, an example of which is a copolymer comprising ethyl acrylate/methyl methacrylate/itaconic acid/p-styrene sulphonic acid and/or a salt thereof in a ratio of 37.5/37.5/10/15 mole %, as disclosed in EP-A-0429179 the disclosure of which is incorporated herein by reference; and (ii) an acrylic and/or methacrylic polymeric resin, an example of which is a polymer comprising about 35 to 60 mole % ethyl acrylate, about 30 to 55 mole % methyl methacrylate and about 2 to 20 mole % methacrylamide, as disclosed, in EP-A-0408197 the disclosure of which is incorporated herein by reference.

The primer or adherent layer may also comprise a cross-linking agent which improves adhesion to the substrate and should also be capable of internal cross-linking. Suitable cross-linking agents include optionally alkoxylated condensation products of melamine with formaldehyde. The primer or adherent layer may also comprise a cross-linking catalyst, such as ammonium sulphate, to facilitate the cross-linking of the cross-linking agent. Other suitable cross-linking agents and catalysts are disclosed in EP-A-0429179, the disclosures of which are incorporated herein by reference.

The primer disclosed in U.S. Pat. No. 3,443,950, the disclosure of which is incorporated herein by reference, is particularly suitable for use in association with the hard-coats described hereinabove.

The coating of the primer layer onto the substrate may be performed in-line or off-line, but is preferably performed "in-line", and preferably between the forward and sideways stretches of a biaxial stretching operation.

Roll to be Treated

The roll of film which can be further treated according to the present invention is preferably at least 10 m in length, preferably at least 20 m, more preferably at least 100 m and most preferably at least 500 m. The film should also be at least 250 mm in width, preferably at least 370 mm, preferably at least 500 mm, preferably at least 1000 mm, and most preferably at least or about 1500 mm in width.

Winding tension applied during the collection of the film roll should be such that an air gap between consecutive turns of film, from the inner core to the outer layers, is maintained as constant. The dimension of the air-gap between consecutive layers should be greater then 2 μm, preferably greater than 10 μm and most preferably greater than 15 μm. It is recognized that the dimensions of the gap which can be achieved depend on several factors, including the thickness of the film and its uniformity. Reference is made to the publication "PET Packaging Technology", D. W. Brooks and G A. Giles Editors (Sheffield Academic Press, 2002) simply to underline the number of considerations which can be made to ensure a roll with consistent physical properties throughout can be prepared.

An example of the conditions under which a roll of film has been prepared for this study is for film of a thickness 125 μm, a winding speed of 60 m/minute, a winding tension of 300 N/m width and winder oscillation distance of at least 100 mm. These conditions are provided purely as an illustration and are not intended to limit in any way the scope of this application.

It is particularly advantageous for the edge of the film to be knurled, which is a physical embossing of the film surface, to allow separation of subsequent layers in a roll and an air-gap of a suitable dimension to be established. The dimension of the air-gap is critical to the above-Tg annealing treatment in order to accommodate the dimensional change of the film as a result of its natural thermal expansion and contraction and its irreversible thermal shrinkage. A further advantage of the knurling treatment is to prevent the unwanted, relative movement of the roll windings during handling. Known as telescoping, this behaviour occurs easily in a roll which has been wound under low tension and which contains large air-gaps between its layers.

The use of an interleave film can also offer advantages during the winding and subsequent above-Tg annealing of a roll of film, particularly for a planarised film. The interleave comprises a second length of film or material which is co-wound with the principal film. The interleave provides protection and support to the principal film, while affording a physical separation between each winding layer in the roll.

Thermal Programme for Above-Tg Annealing

In order to enhance the dimensional stability of a polyester film by annealing above its Tg, the roll of film must be subjected to at least one cycle which comprises the steps heating, isothermal conditioning and cooling. The rate of heating and cooling within each cycle is critical to minimize temperature gradients between the layers of the roll and minimize distortion due to uneven expansion, contraction and shrinkage. Each of the respective layers of the film roll should experience the annealing temperature ($T_a$) for the time (t). The appropriate programmed rate of change in temperature of the circulating air in the oven will depend on factors such as the length of the film roll, the film thickness and the air-gap between respective layers on the roll. The optimum rate of heating and cooling can be derived by experiment or calculation and will ideally also take into account the change in the natural behaviour of film around its Tg, from that dominated by its coefficient of thermal expansion, which is a thermo-reversible property, to that influenced additionally by its irreversible thermal shrinkage. For a roll of film of thickness 125 μm, length 1000 m, width 1 m, a typical thermal cycle would comprise ambient temperature to (Tg) at greater than 0.03° C. per minute, and from (Tg) to the annealing temperature ($T_a$) at greater than 0.01° C./minute. The cycle would continue with an isothermal period at $T_a$ of not more than 72 hours, followed by cooling from $T_a$ to Tg at greater than 0.02° C./minute then from Tg to ambient at greater than 0.03° C./minute.

In order to further minimize the risk of distortion, two or more thermal cycles may be performed, where each successive treatment applies a progressively higher annealing temperature. This is advantageous if the film is rewound after cooling, and between consecutive cycles. Rewinding is preferably reverse winding, where any natural machine direction (MD) curl of the film is opposed by the direction of the rewind.

Preferably, the temperature differential between successive layers during the ramping-up and cooling-down stages is no more than 0.4° C., preferably no more than 0.3° C., preferably no more than 0.2° C., preferably no more than 0.1° C., and preferably no more than 0.06° C. As an example of the preferred thermal cycle, the following conditions were calculated to ensure the temperature differential between successive layers of film on a roll was kept below 0.06° C. The latter limit was chosen to ensure differential expansion or contraction, or irreversible shrinkage between adjacent film windings would not result in localised pressure between layers and physical distortion of the roll.

Tables A and B below set out an example of the calculated temperature profile for the thermal cycling of PEN film according to the process of the present invention:

TABLE A

Details of Roll

| Film Dimensions | | | | Roll Dimensions | |
| --- | --- | --- | --- | --- | --- |
| Width (m) | Thickness (μm) | Length (m) | Entrained air gap (μm) | Core diameter (mm) | Roll Diameter (mm) |
| 1 | 125 | 1000 | 12 | 152 | 445 |

TABLE B

Above-Tg Annealing Programme Settings

| Process Step | Oven Setting |
| --- | --- |
| Roll Start Temperature | 20° C. |
| Oven Air Start Temperature | 20° C. |
| Oven Air Intermediate Temperature | 120° C. |
| Oven Air Maximum Temperature | 165° C. |
| Oven Air Final Temperature | 25° C. |
| Ramp time, start-intermediate | 40 hrs |
| Ramp time, intermediate-maximum | 40 hrs |
| Time at maximum temperature | 48 hrs |
| Ramp time, maximum-final | 60 hrs |
| Time at final temperature | 22 hrs |
| Total time | 210 hrs |

In one embodiment, the present invention provides a process in which a wound roll of biaxially oriented polyester film having a glass transition temperature (Tg (° C.)) is annealed at a temperature $T_a$ (° C.) above Tg where $Tg < T_a \leq Tg+100$ (° C.) for a time t after thermal equilibrium where $1 \text{ hour} \leq t \leq 72$ hours and cooled, with the provisos that:

(i) where the polyester film to be annealed is poly(ethylene terephthalate) film having a Tg of 99° C. and $T_a$ is 100 or 149° C. then t is not 1, 2, 4 or 8 hours, and (ii) where the polyester film to be annealed is poly(ethylene terephthalate) film having a Tg of 104° C. and $T_a$ is 116 or 149° C. then t is not 8 or 24 hours, and (iii) where the polyester film to be annealed is poly(1,4-cyclohexylene dimethylene terephthalate) film having a Tg of 109° C. and $T_a$ is 120 or 149° C. then t is not 24 hours, more preferably with the provisos that:

(i-a) where the polyester film to be annealed is poly(ethylene terephthalate) film having a Tg of 99° C., then $T_a$ is not 100 or 149° C., and (ii-a) where the polyester film to be annealed is poly(ethylene terephthalate) film having a Tg of 104° C., then $T_a$ is not 116 or 149° C., and (iii-a) where the polyester film to be annealed is poly(1,4-cyclohexylene dimethylene terephthalate) film having a Tg of 109° C., then $T_a$ is not 120 or 149° C., and most preferably with the provisos that:

(i-b) that the polyester film to be annealed is not poly(ethylene terephthalate) film having a Tg of 99° C., and (ii-b) that the polyester film to be annealed is not poly(ethylene terephthalate) film having a Tg of 104° C., and (iii-b) that the polyester film to be annealed is not poly(1,4-cyclohexylene dimethylene terephthalate) film having a Tg of 109° C., particularly with the further proviso that said polyester film does not have on a surface thereof a gelatine layer.

In a further embodiment, the present invention further provides a wound roll of biaxially oriented polyester film, wherein said film exhibits dimensional change in both its MD and TD after heating to 180° C. for 30 minutes of less than or equal to 0.08%, more preferably less than or equal to 0.05% and most preferably less than or equal to 0.03%, with a first proviso that said polyester film does not have on a surface thereof a gelatine layer and in one embodiment is uncoated, and/or with a second proviso that the polyester film is other than:

(i) a poly(ethylene terephthalate) film having a Tg of 99° C., particularly one which is annealed at a temperature $T_a$ of 100 or 149° C. particularly for 1, 2, 4 or 8 hours;

(ii) a poly(ethylene terephthalate) film having a Tg of 104° C., particularly one which is annealed at a temperature $T_a$ of 116 or 149° C. particularly for 8 or 24 hours; and (iii) a poly(1,4-cyclohexylene dimethylene terephthalate) film having a Tg of 109° C., particularly one which is annealed at a temperature $T_a$ of 120 or 149° C. particularly for 24 hours, said values of Tg being measured prior to said annealing, and the present invention further provides said biaxially oriented polyester film, per se.

In a further embodiment, the present invention further provides a wound roll of biaxially oriented composite film comprising a polyester substrate supporting one or more coatings on one or both surfaces of said substrate, wherein said film exhibits a dimensional change in both its MD and its TD after heating to 180° C. for 30 minutes of less than or equal to 0.08%, more preferably less than or equal to 0.05% and most preferably less than or equal to 0.03%, and which preferably also exhibits a haze value of no more than 1.5% and a total luminance transmission (TLT) of at least 85%, with the first proviso that said coating is not a gelatine layer and/or with the second proviso that the polyester film is other than:

(i) a poly(ethylene terephthalate) film having a Tg of 99° C., particularly one which is annealed at a temperature $T_a$ of 100 or 149° C. particularly for 1, 2, 4 or 8 hours; and (ii) a poly(ethylene terephthalate) film having a Tg of 104° C., particularly one which is annealed at a temperature $T_a$ of 116 or 149° C. particularly for 8 or 24 hours; and (iii) a poly(1,4-cyclohexylene dimethylene terephthalate) film having a Tg of 109° C., particularly one which is annealed at a temperature $T_a$ of 120 or 149° C. particularly for 24 hours, said values of Tg being measured prior to said annealing, and the present invention further provides said biaxially oriented composite film, per se.

In a preferred embodiment, the present invention provides a wound roll of biaxially oriented poly(ethylene naphthalate) film, wherein said film exhibits dimensional change in both its MD and its TD after heating to 180° C. for 30 minutes of less than or equal to 0.08%, more preferably less than or equal to 0.05% and most preferably less than or equal to 0.03%, optionally wherein said poly(ethylene naphthalate) film supports one or more coatings on one or both surfaces of said film wherein the composite structure comprising said poly(ethylene naphthalate) film and said coating(s) preferably also exhibits a haze value of no more than 1.5% and a total luminance transmission (TLT) of at least 85%, particularly wherein said coating is other than a gelatine layer, and the present invention further provides said biaxially oriented film, per se.

The coated and subsequently annealed films of the present invention preferably have a % of scattered visible light (haze) of <10%, preferably <6%, more preferably <3.5% and particularly <1.5%, measured according to the standard ASTM D 1003.

It will be appreciated that, in the present invention, the dimensional stability characteristics of the biaxially oriented polyester film (or roll-annealed wound roll thereof) described herein refer either (a) to the uncoated biaxially oriented polyester film (or roll-annealed wound roll thereof), or (b) to the biaxially oriented composite film (or roll-annealed wound roll thereof) consisting essentially of a polyester substrate, an optional primer layer on one or both surfaces of the substrate and a coating layer on one or both surfaces of the optionally primed substrate wherein said coating layer is selected from those described hereinabove, and preferably from the hardcoat planarising compositions described hereinabove, and more preferably from:

(i) an organic coating comprising a low molecular weight reactive diluent preferably selected from monomeric acrylates; an unsaturated oligomer preferably selected from acrylates, urethane acrylates, polyether acrylates, epoxy acrylates and polyester acrylates; a solvent; and a photoinitiator;

(ii) an organic/inorganic hybrid coating comprising inorganic particles preferably selected from silica and metal oxides; and an organic component comprising a low molecular weight reactive component (for example, selected from monomeric acrylates) and/or an unsaturated oligomeric component (preferably selected from acrylates, urethane acrylates, polyether acrylates, epoxy acrylates and polyester acrylates); and a solvent, and optionally further comprising a photoinitiator; and (iii) a predominantly inorganic hardcoat comprising inorganic particles contained in a polymerisable predominantly inorganic matrix preferably selected from a polysiloxane, wherein said coating layer preferably has a dry thickness of from 1 to 20 microns.

Property Measurement

The following approaches were used to characterize the film properties which changed as a consequence of the process described herein:

(i) Thermal shrinkage was assessed for film samples of dimensions 200 mm×10 mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200 mm dimension of the test sample is oriented along the machine direction of the film. After heating the specimen to a predetermined temperature and holding for an interval of 30 minutes, it was cooled to room temperature and its dimensions re-measured manually. The thermal shrinkage was calculated and expressed as a percentage of the original length. Using this method the thermal shrinkage at 180 and 200° C. was measured.

(ii) When a sample of film is examined on a flat surface, it can often exhibit a physical curl. This can arise from its process history, or through a second, slower creep process under permanent physical distortion. The curl of a film can be assessed by a simple physical measurement of the "lift" or height from a flat surface, to which the edge or corner of a specimen is raised. Thus curl was measured of samples of film 100 mm×10 mm in dimension, cut in a specific direction relative to the parent roll (i.e. such that the 100 mm dimension corresponded to the film direction for which the measurement is desired) and which were laid on a flat, horizontal surface. The lift was measured for each corner and an average calculated.

(iii) For film samples which were essentially transparent, that is containing sufficiently low levels of additive, pigment, void or other body which would render it opaque, film clarity was evaluated. This was achieved by measuring total luminance transmission (TLT) and haze (% of scattered transmitted visible light) through the total thickness of the film using a Gardner XL 211 hazemeter in accordance with ASTM D-1003-61.

(iv) The glass transition temperature (Tg) of the polyester film was measured using Differential Scanning Calorimetry (DSC) techniques. The measurement was performed using a TA Instruments Q100 DSC System, calibrated using an indium standard. Samples of film were heated from below ambient temperature (approximately −20° C.) to 300° C. and final values of temperature were reported for a heating rate of 20° K./minute. The Tg is measured in respect of the biaxially oriented polyester film before it is exposed to the annealing process of the invention described herein and, for the avoidance of doubt, it is this value of Tg which is used to determine the annealing temperature ($T_a$) of the process.

The invention is further illustrated by the following examples. The examples are not intended to limit the invention as described above. Modification of detail may be made without departing from the scope of the invention.

EXAMPLES

Comparative Example 1

A polymer composition comprising PEN was extruded and cast onto a hot rotating polished drum. The film was then fed to a forward draw unit where it was stretched over a series of temperature-controlled rollers in the direction of extrusion to approximately 3.1 times its original dimensions. The draw temperature was approximately 130° C. The film was then passed into a stenter oven at a temperature of 135° C. there the film was stretched in the sideways direction to approximately 3.4 times its original dimensions. The biaxially stretched film was then heat-set at temperatures up to 235° C. by conventional means before being cooled and would onto reels. The total thickness was 125 µm. The heat-set biaxially stretched film was then unwound and then further heat-stabilised in a roll-to-roll process by passing the film through an additional set of ovens, of which the maximum temperature was 190° C. The film was unsupported at its edges and transported through the ovens under a low line tension, allowing it to relax and stabilize further.

Reference Examples 1-9

The procedure in comparative example 1 was repeated and a single sheet of the film obtained by that process further treated by annealing in a circulating air oven. The conditions are summarized in Table 1, together with the dimensional change (shrinkage) after testing at 180° C. for 30 minutes and optical properties (haze and TLT).

TABLE 1

| Sample | Annealing Temperature, C. | Annealing Time, hrs | Test Direction | Shrinkage (%) | Haze (%) | TLT (%) |
|---|---|---|---|---|---|---|
| C. Ex. 1 | — | — | MD | 0.16 | 0.82 | 86.8 |
|  |  |  | TD | -0.12 |  |  |
| Ref. Ex. 1 | 95 | 24 | MD | 0.18 | 1.02 | 86.9 |
|  |  |  | TD | -0.15 |  |  |
| Ref. Ex. 2 | 115 | 1 | MD | 0.13 | 0.97 | 86.8 |
|  |  |  | TD | -0.1 |  |  |
| Ref. Ex. 3 | 115 | 10 | MD | 0.12 | 1.06 | 85.2 |
|  |  |  | TD | -0.1 |  |  |
| Ref. Ex. 4 | 115 | 24 | MD | 0.13 | 1.15 | 86.8 |
|  |  |  | TD | -0.11 |  |  |
| Ref. Ex. 5 | 115 | 100 | MD | 0.11 | 1 | 86.7 |
|  |  |  | TD | -0.11 |  |  |
| Ref. Ex. 6 | 135 | 24 | MD | 0.09 | 1.77 | 86.8 |
|  |  |  | TD | -0.07 |  |  |
| Ref. Ex. 7 | 155 | 24 | MD | 0.04 | 5.63 | 86.9 |
|  |  |  | TD | -0.03 |  |  |
| Ref. Ex. 8 | 175 | 24 | MD | 0 | 15.06 | 86.7 |
|  |  |  | TD | 0.01 |  |  |
| Ref. Ex. 9 | 195 | 24 | MD | 0 | 30.09 | 86.2 |
|  |  |  | TD | 0 |  |  |

It is clear that increasing the temperature of annealing results in lower residual dimensional change or shrink in the treated film during subsequent testing. The data in Table 1 demonstrate that the most significant improvements in dimensional stability are observed (reference examples 6 to 9) when the temperature of the annealing process is above the Tg of the PEN polyester film starting material (about 120° C.) It is known in the art that to achieve a value of, or close to, zero percent shrinkage for annealed film, the annealing process must be carried out in the absence of any tension applied to the material at that temperature. For a continuous relaxation process which involves collecting the annealed film by winding, there will always exist a finite line tension to control sideways wander or tracking problems of the web through the process and to operate the final winding step. The continuous relaxation process on the commercial scale therefore suffers from the disadvantage that it always imposes a finite residual shrinkage in the annealed film. Comparative example 1 represents such a case where, despite off-line thermal relaxation in a continuous annealing process, it exhibits a further, measurable shrinkage after reheating to 180° C. In contrast, the results for reference examples 8 and 9 demonstrate that no tension is present in the film during the annealing cycles of those films.

Table 1 also highlights the property of haze in the film sample, and its sensitivity to thermal annealing. The haze which develops in each sample is known to be caused by crystals of cyclic oligomer. The oligomer present in the bulk of the film diffuses to the surface where it sublimes and crystallizes. This process intensifies at elevated temperature and it is clear from the data that haze becomes significant above 135° C. For many applications, this surface deposit would impair the performance and limit the attractiveness of the film. Techniques which are commonly used to clean a film surface may therefore need to be employed to render useable, films which have been annealed at high temperatures.

A further option to address the surface deposition of oligomeric material during annealing is to prevent the migration of the oligomer from the bulk of the film. Since the principle applications for which the property of high dimensional stability, and therefore the present annealing processes, are intended are in the electronic and photonic businesses, the film will normally support a coating and additional functional layers. The appropriate choice of coating can therefore perform two functions, namely that associated with the use of the finished product, and the protection of the surface against oligomer deposition.

Comparative Example 2

The procedure in comparative example 1 was repeated except that the draw ratio applied in the direction of extrusion (MD) was increased to 3.3 and during the heat setting stage, the transverse dimensions of the web were reduced by 4%. During manufacture, the film was also treated on both surfaces with a primer coating, to promote adhesion to a subsequent, thicker coating. The biaxially stretched, heat-set, surface-primed and offline-stabilized film was then unwound and further modified on both sides by coating with a material designed to cure to a hard, smooth finish, and again heated, cooled and rewound. The coating was of the inorganic hardcoat type described previously and disclosed in WO-A-03/087247. It was prepared before application by the following steps:

(i) 517 cm$^3$ of methyltrimethoxysilane (obtained from OSi Specialities) was added to 1034 cm3 demineralised water at room temperature and stirred for 24 hours.

(ii) 54 cm$^3$ of 3-glycidoxypropyl trimethoxysilane (obtained from Aldrich Chemical Company) was added to 108 cm$^3$ of demineralised water at room temperature and stirred for 24 hours.

(iii) 53 cm$^3$ of 10% aqueous acetic acid (Aldrich Chemical Company) was added to 700 cm$^3$ of Ludox LS colloidal silica (12 nm). To this was added 162 cm$^3$ of the hydrolysed 3-glycidoxypropyl trimethoxysilane/water mixture and 1551 cm$^3$ of the hydrolysed methyltrimethoxysilane/water mixture. This mixture was stirred for 12 hours before coating. The final pH of the composition was 6.05.

The coating was applied to both surfaces of the polyester film, to a thickness of 3 µm and crosslinked thermally.

Reference Examples 10-18

The procedure in comparative example 2 was repeated and a single sheet of the film further treated by annealing in a circulating air oven. The conditions are summarized in Table 2, together with the corresponding optical properties (haze and TLT values).

TABLE 2

| Sample | Annealing Temperature, C. | Annealing Time, hrs | Haze (%) | TLT (%) |
|---|---|---|---|---|
| C. Ex. 2 | — | — | 0.42 | 91.4 |
| Ref. Ex. 10 | 95 | 24 | 0.66 | 91.3 |
| Ref. Ex. 11 | 115 | 1 | 0.43 | 91.4 |
| Ref. Ex. 12 | 115 | 10 | 0.44 | 91.4 |
| Ref. Ex. 13 | 115 | 24 | 0.47 | 91.4 |
| Ref. Ex. 14 | 115 | 100 | 0.54 | 91.3 |
| Ref. Ex. 15 | 135 | 24 | 0.45 | 91.4 |
| Ref. Ex. 16 | 155 | 24 | 0.47 | 91.4 |
| Ref. Ex. 17 | 175 | 24 | 0.71 | 91.4 |
| Ref. Ex. 18 | 195 | 24 | 1.73 | 90.8 |

Comparing tables 1 and 2 shows the benefit from an appropriate coating on each side of PEN film which is subjected to an annealing procedure. The optical properties are initially improved over those of comparative example 1 as a result of coating, and this quality persists during annealing at up to 155° C. Indeed the optical properties of the coated film remain superior to comparative example 1 even after annealing for 24 hours at 175° C.

Comparative Example 4 and Examples 19-22

A procedure similar to that described for comparative example 1 was conducted to generate a roll of film (comparative example 4). A minimum line tension was applied during the heat-stabilisation step, which had the effect of producing more balanced shrinkage properties in the MD and TD. A roll of that film was then further treated by annealing in a circulating air oven to generate examples 19-22.

Comparative Example 3 and Examples 23-29

A procedure similar to that described for comparative example 4 was conducted to generate a roll of film which was then further modified by applying a raised, knurling pattern along the full length of each edge (comparative example 3). A roll of that film was then further treated by annealing in a circulating air oven to generate examples 23-29.

Comparative Example 5 and Examples 30-31

A procedure similar to that described for comparative example 2 was conducted to generate a roll of coated film (comparative example 5), and a roll of that film further treated by annealing in a circulating air oven to generate examples 30 and 31.

The roll length and the annealing conditions for the above examples are summarized in Table 3, together with dimensional stability data after heating at 180° C. for 30 minutes.

TABLE 3

| Sample | Roll Length (m) | Heat Treatment | Location in roll of test Specimen[d] | Test Direction | Shrinkage (%) |
|---|---|---|---|---|---|
| C. Ex. 4 | 100 | — | outer surface | MD | 0.11 |
|  |  |  |  | TD | 0.09 |
| Example 19 | 2 | Programme 1[a] | middle | MD | 0.01 |
|  |  |  |  | TD | 0.01 |
| Example 20 | 2 | Programme 2[b] | middle | MD | 0.03 |
|  |  |  |  | TD | 0.02 |
| Example 21 | 20 | Programme 2 | outer surface | MD | 0.07 |
|  |  |  |  | TD | 0.01 |
| Example 22 | 20 | Programme 2 | inner core | MD | 0.03 |
|  |  |  |  | TD | 0.03 |
| C. Ex. 3 | 100 | — | outer surface | MD | 0.1 |
|  |  |  |  | TD | 0.12 |
| Example 23 | 2 | Programme 2 | middle | MD | 0.08 |
|  |  |  |  | TD | 0.06 |
| Example 24 | 20 | Programme 1 | outer surface | MD | 0.04 |
|  |  |  |  | TD | 0.02 |
| Example 25 | 20 | Programme 1 | inner core | MD | 0.03 |
|  |  |  |  | TD | −0.03 |
| Example 26 | 20 | Programme 2 | outer surface | MD | 0.06 |
|  |  |  |  | TD | 0.05 |
| Example 27 | 20 | Programme 2 | inner core | MD | 0.04 |
|  |  |  |  | TD | 0.04 |
| Example 28 | 100 | Programme 3[c] | outer surface | MD | 0.02 |
|  |  |  |  | TD | 0.00 |
| Example 29 | 100 | programme 3 | inner core | MD | 0.03 |
|  |  |  |  | TD | 0.02 |
| C. Ex. 5 | 10 | — | outer surface | MD | 0.11 |
|  |  |  |  | TD | 0.03 |
| Example 30 | 10 | Programme 1 | outer surface | MD | 0.02 |
|  |  |  |  | TD | 0.00 |
| Example 31 | 10 | Programme 1 | inner core | MD | 0.03 |
|  |  |  |  | TD | −0.01 |

Key
[a]Programme 1 was 24 hours at 165° C. with heating and cooling times of 6 hours
[b]Programme 2 was 3 cycles, each 24 hours at 125° C., 145° C. and 165° C.
[c]Programme 3 was 24 hours at 165° C. with heating and cooling times of 24 hours
[d]Samples were removed from the rolls at three depths from the roll surface, namely the outer surface, the core of the roll and at an intermediate depth, and tested for shrinkage.

The results demonstrate a principle discovery, namely that annealing a polyester film in the form of a roll, above its Tg (that is, for the avoidance of doubt, the Tg of the polyester film measured prior to annealing), can achieve an improvement in shrinkage properties which surpass that imparted by previous stabilization processes. The residual dimensional shrinkage of less than 0.03% reflects the near zero tension present in the film during annealing, a level which cannot be achieved by other continuous stabilization processes. Yet this annealing treatment is strictly a continuous process since it provides rolls of stabilized film which can be further employed in continuous, downstream processes. A further feature demonstrated by example pairs 24 and 25, 26 and 27, 28 and 29, and 30 and 31 is that the improved shrinkage behaviour is imparted consistently along the length of the roll of film. The discovery that such a feature, namely the very low levels of tension and therefore extremely low shrinkage behaviour can be achieved in film in the form of a roll, during annealing at temperatures above the Tg, was entirely unexpected. The observation that annealing the film in the form of a roll provides exceptionally low shrinkages could not have been predicted on the basis of the exceptionally low shrinkages observed when a single sheet of the same film is annealed at similar temperatures. The film in a roll of film is expected to be associated with some residual tension. The shrinkages observed in respect of film which has been annealed whilst in roll form are, unexpectedly, similar to the shrinkages observed in respect of film which has been annealed under zero tension in single sheet form. These shrinkages are a significant improvement over conventional roll-to-roll annealing processes in which film is annealed in unwound form under low tension. The present invention therefore provides an advantage over such annealing processes in terms of both economy and film quality. In a roll-to-roll annealing processes, film wander or telescoping may occur, and air may become entrained in successive film layers on the reel.

The process of the invention therefore provides a new opportunity for roll-to-roll or continuous fabrication processes to employ film which possesses a greater degree of thermal, dimensional stability than those produced by conventional stabilization processes.

The benefit to the optical properties of a coating is shown to apply also to a film which is annealed in the rolled configuration. In examples 30 and 31, no haze value greater than 0.85% and 0.86% respectively was produced as a result of annealing film which was coated on both surfaces.

Figure 2:
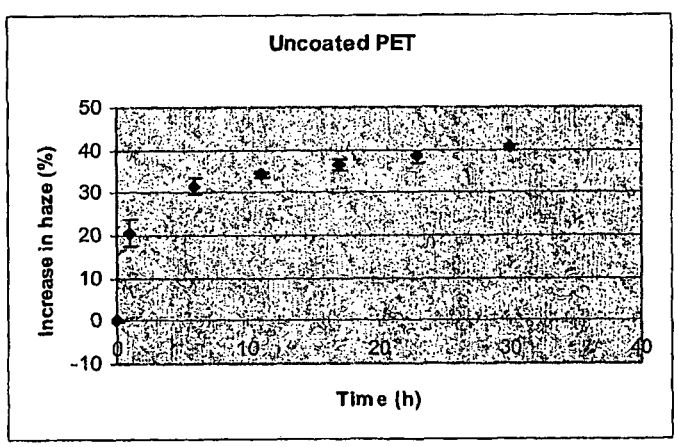

To further investigate the use of coatings to reduce the haze produced in the annealing process, the procedure of comparative example 2 was repeated with the coating compositions described below in Examples 32 to 38, using PEN and/or PET as the substrate. The PET film was Melinex® ST506 having a thickness of 125 μm, commercially available from Dupont Teijin Films. The final dry coating thickness, after curing/drying, was 2 μm. The coated film was then annealed in an oven for up to 30 hours at approximately Tg+80° C. (i.e. 200° C. for a PEN film; 150° C. for a PET film) and the haze measured over that period. The following results can be compared to:

(i) the uncoated PEN film which exhibited an initial average haze value (i.e. t=0 h) of 1.4% which increased to 48.8% (an increase of 47.4%), as shown in the graph of FIG. 1; and (ii) the uncoated PET film which exhibited an initial average haze value of 0.91% which increased to 41.4% (an increase of 40.5%), as shown in the graph of FIG. 2, when annealed under these conditions. Average haze values were calculated by taking the average of three values measured across the width of the film.

Example 32

Figure 3:
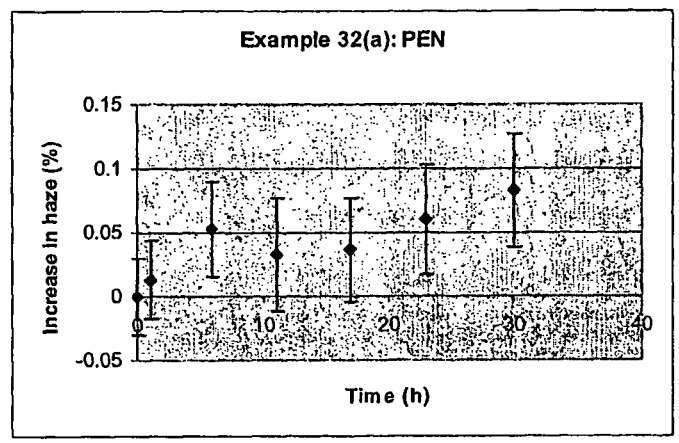
FIGS. 3-10 are graphs showing haze increase as a function of annealing time for several coated PEN and PET films, according to the invention.
Figure 4:
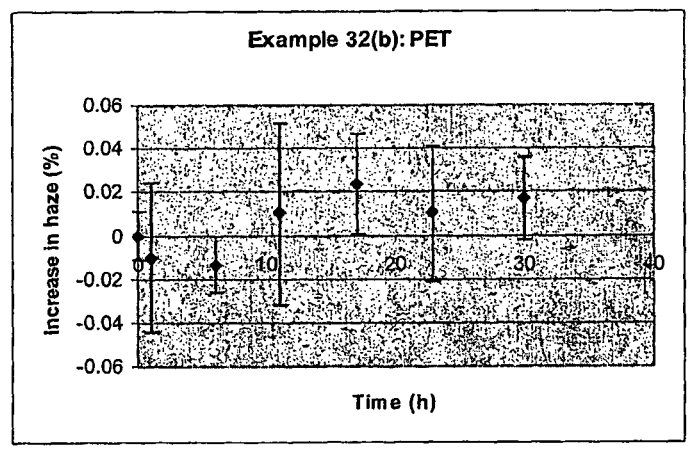

An organic coating composition comprising a mixture of monomeric and polymeric acrylates (including methylmethacrylate and ethylacrylate) and a photoinitiator (Irgacure™ 2959; Ciba) in a solvent of methyl ethyl ketone (2-butanone) was prepared at 26.5 wt % solids (of which about 1% of these solids is the photoinitiator) to a viscosity of about 1.22 cP (centipoise). The coating was dried at 80° C. and then cured by UV-radiation. The haze measurements of the coated film after annealing for up to 30 hours are shown in the graphs of FIGS. 3 and 4. The initial average haze values of the PEN and PET films were 0.74% and 0.48%, respectively.

Example 33

Figure 5:
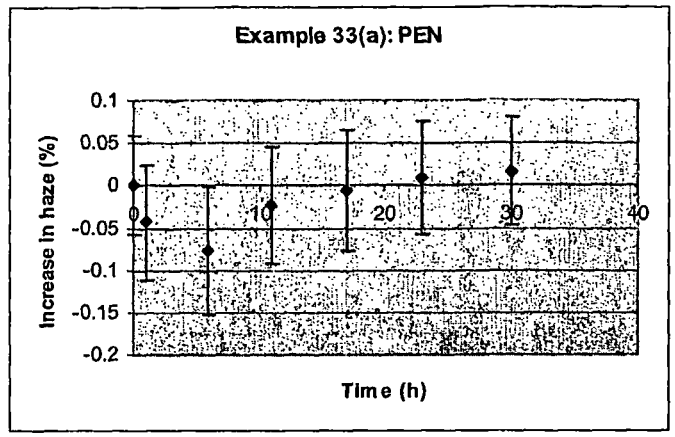
Figure 6:
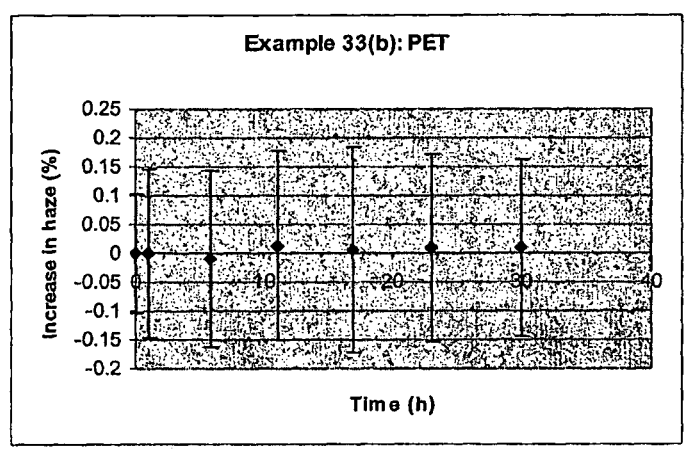

A hybrid organic/inorganic coating composition comprising acrylate monomers and silica particles in MEK solvent was prepared to 10% solids and a viscosity of about 1.7 cP. The coating was applied and then cured immediately by 1N-radiation. The haze measurements of the coated film after annealing for up to 30 hours are shown in the graphs of FIGS. 5 and 6. The initial average haze values of the PEN and PET films were 0.88% and 0.53%, respectively.

Example 34

Figure 7:
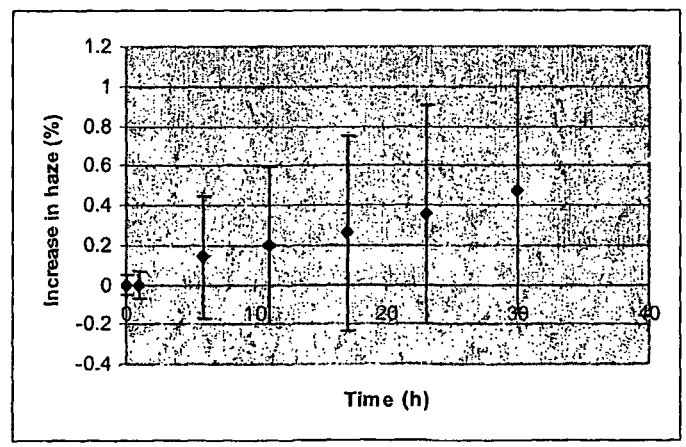

The coating composition of comparative example 2 was coated onto the PET substrate referred to above, and the haze measurements of the coated film after annealing for up to 30 hours are shown in the graph of FIG. 7. The initial average haze of the film was 0.50%.

Example 35

A coating comprising polyethylene imine (Sigma Aldrich code 181978-8; average molecular weight Mw of about 750,000) and a crosslinker (Cymel™ 385) in water at approximately 5% by weight PEI solids, was coated onto the substrate and thermally cured at 180° C. The haze measurements of the coated film after annealing for up to 30 hours are shown in Tables 4 and 5 below.

TABLE 4

| PEI on PEN | | |
|---|---|---|
| Time (h) | Average Haze (%) | Increase (%) in haze |
| 0 | 1.27 | 0 |
| 1 | 1.27 | 0 |
| 6 | 1.30 | 0.03 |
| 11 | 1.36 | 0.09 |
| 17 | 1.41 | 0.14 |
| 23 | 1.43 | 0.16 |
| 30 | 1.42 | 0.15 |

TABLE 5

PEI on PET

| Time h | Average Haze (%) | Increase (%) in haze |
|---|---|---|
| 0 | 4.58 | 0 |
| 1 | 5.43 | 0.85 |
| 6 | 5.58 | 1.00 |
| 11 | 6.38 | 1.80 |
| 17 | 6.28 | 1.70 |
| 23 | 6.81 | 2.23 |
| 30 | 7.80 | 3.22 |

Example 36

Figure 8:
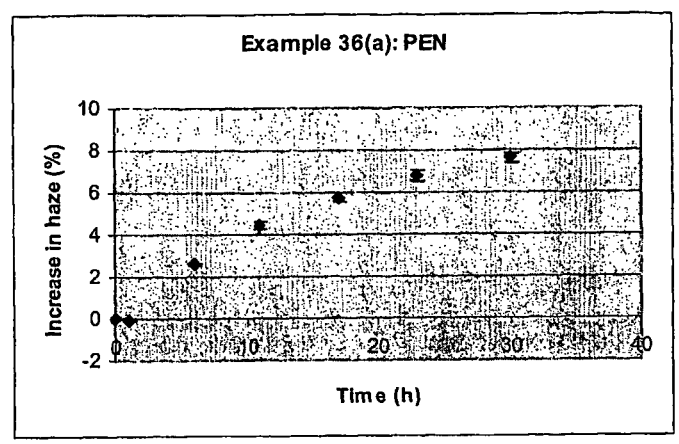
Figure 9:
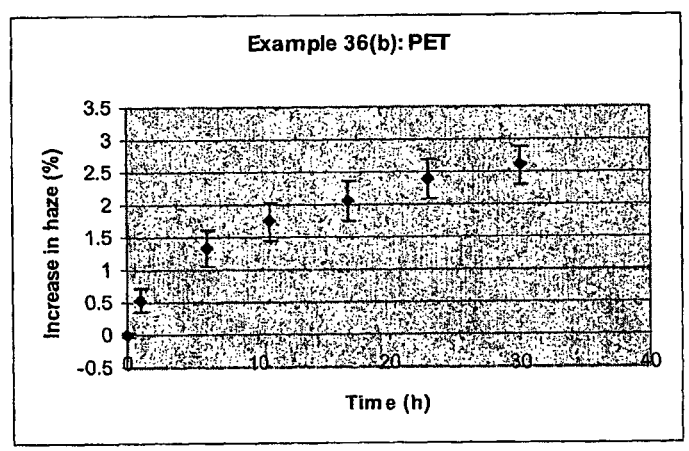

A thermally-curable coating composition comprising epoxy resin in combination with silica particles present at a concentration of about 41% by weight of the solids of the coating composition, which in turn comprises about 10% by weight total solids in an alcoholic solution (a mixed solvent system of isopropanol, n-butanol, ethanol and cyclohexanone). The composition is stirred for 6 hours at room temperature, coated and then thermally cured at 180° C. The haze measurements of the coated films after annealing for up to 30 hours are shown in the graphs of FIGS. 8 and 9. The initial average haze values of the PEN and PET films were 0.65% and 0.45%, respectively.

Example 37

A thermally-curable coating comprising polyester (TPE 62C; Takemoto Oil and Fat Company, Japan), a crosslinker (Cymel™ 385) in aqueous solvent (8% total solids, of which 86% is the polyester) was coated onto the PEN substrate and thermally cured at 180° C. The haze measurements of the coated film after annealing for up to 30 hours are shown in Table 6 below.

TABLE 6

| Time (h) | Average Haze (%) | Increase (%) in haze |
|---|---|---|
| 0 | 1.06 | 0 |
| 1 | 0.83 | −0.23 |
| 6 | 3.87 | 2.82 |
| 11 | 5.76 | 4.70 |
| 17 | 7.35 | 6.29 |
| 23 | 8.16 | 7.11 |
| 30 | 9.46 | 8.40 |

Example 38

Figure 10:
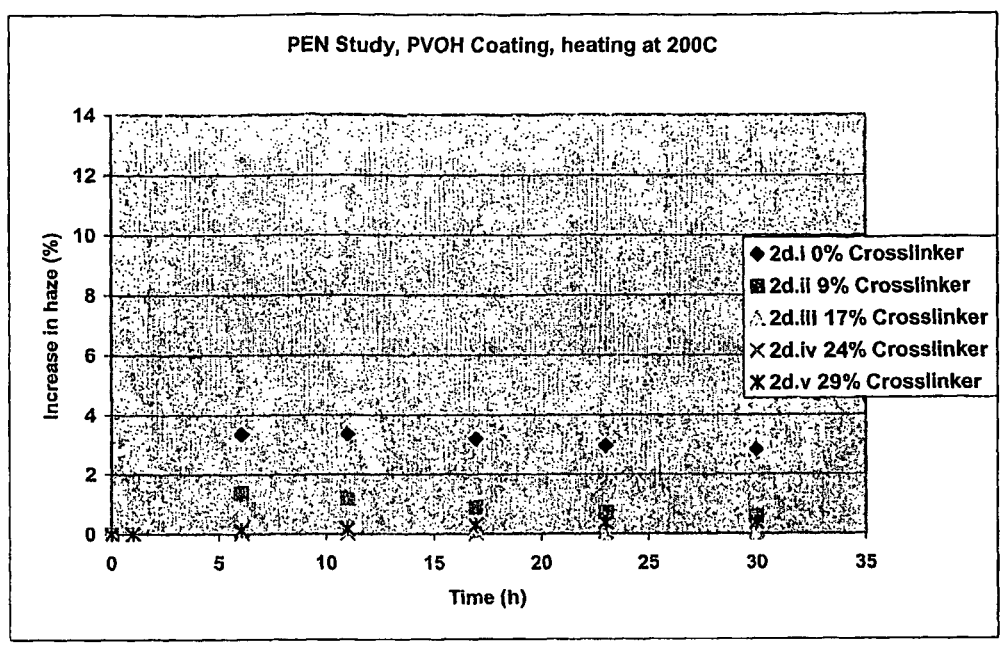

A coating composition comprising PVOH (Airvol™ 24-203; Air Products) at 24% by weight of the coating composition, a surfactant (Caflon™ NP10; Uniqema) at 10% by weight of the coating composition and varying amounts (0 9, 17, 24 and 29% by weight of the PVOH present in the composition) of crosslinking agent (Cymel™ 350), in aqueous solvent, was coated onto the PEN substrate and thermally cured at 180° C. The haze measurements of the coated films after annealing for up to 30 hours are shown the graph of FIG. 10. The initial average haze values of the coated PEN films were 0.73% (no crosslinker), 0.74% (9% crosslinker), 0.76% (17% crosslinker), 0.59% (24% crosslinker) and 0.8% (29% crosslinker).

Examples 32 to 38 demonstrate the effectiveness of the coatings described herein to reduce the formation of haze during the annealing process described herein, relative to the uncoated films.

The invention claimed is:

1. A method of improving the shrinkage of biaxially oriented polyester film having a glass transition temperature (Tg (° C.)), said method comprising the steps of annealing a wound roll of said film at a temperature $T_a$ (° C.) above Tg where $Tg<T_a \le Tg+100$ (° C.) for a time t after thermal equilibrium where 1 hour≤t≤72 hours, and then cooling, wherein the roll of film is a composite film comprising one or more coatings on one or both surfaces of a supporting polyester substrate.

2. The method according to claim 1, wherein 1 hour≤t≤48 hours.

3. The method according to claim 1, wherein 1 hour≤t≤24 hours.

4. The method according to claim 1, wherein the annealed film exhibits dimensional change in both its machine direction (MD) and its transverse direction (TD) after heating to 180° C. for 30 minutes of less than or equal to 0.08%.

5. The method according to claim 4, wherein the dimensional change is less than or equal to 0.05%.

6. The method according to claim 4, wherein the dimensional change is less than or equal to 0.03%.

7. The method according to claim 1, wherein said polyester is poly(ethylene naphthalate) or poly(ethylene terephthalate).

8. The method according to claim 1, wherein said polyester is poly(ethylene naphthalate).

9. The method according to claim 8, wherein said polyester is derived from 2,6-naphthalenedicarboxylic acid.

10. The method according to claim 8, wherein the poly (ethylene naphthalate) has an intrinsic viscosity of 0.5-1.5.

11. The method according to claim 1, wherein said polyester film is a heat-stabilised, heat-set, biaxially oriented film.

12. The method according to claim 1, wherein a coating is derived from a composition selected from:
   (i) an organic coating comprising a low molecular weight reactive diluent; an unsaturated oligomer; a solvent; and a photoinitiator;
   (ii) an organic/inorganic hybrid coating comprising a low molecular weight reactive component and/or an unsaturated oligomeric component; a solvent; and inorganic particles, and optionally further comprising a photoinitiator; and
   (iii) a hardcoat comprising inorganic particles contained in a polysiloxane.

13. The method according to claim 1, wherein a coating is derived from a composition selected from:
   (i) an organic coating comprising a low molecular weight reactive diluent selected from monomeric acrylates; an unsaturated oligomer selected from acrylates, urethane acrylates, polyether acrylates, epoxy acrylates and polyester acrylates; a solvent; and a photoinitiator;
   (ii) an organic/inorganic hybrid coating comprising a low molecular weight reactive component selected from monomeric acrylates and/or an unsaturated oligomeric component selected from acrylates, urethane acrylates, polyether acrylates, epoxy acrylates and polyester acrylates; a solvent; and inorganic particles selected from silica and metal oxides, and optionally further comprising a photoinitiator; and
   (iii) a hardcoat comprising inorganic particles contained in a polysiloxane.

14. The method according to claim 1, wherein a coating is derived from a composition selected from:

(i) an organic coating comprising a low molecular weight reactive diluent selected from monomeric acrylates; an unsaturated oligomer selected from urethane acrylates, polyether acrylates, epoxy acrylates and polyester acrylates; a solvent; and a photoinitiator;
(ii) an organic/inorganic hybrid coating comprising a low molecular weight reactive component selected from monomeric acrylates and/or an unsaturated oligomeric component selected from urethane acrylates, polyether acrylates, epoxy acrylates and polyester acrylates; a solvent; and inorganic particles selected from silica and metal oxides, and optionally further comprising a photoinitiator; and
(iii) a hardcoat comprising inorganic particles contained in a polysiloxane.

15. The method according to claim 1, wherein a coating is derived from a UV-curable composition comprising monomeric and oligomeric acrylates, and a photoinitiator.

16. The method according to claim 1, wherein a coating is derived from a UV-curable composition comprising monomeric acrylates, silica particles and a photoinitiator.

17. The method according to claim 1, wherein a coating is derived from a composition comprising:
(a) from about 5 to about 50 weight percent solids, the solids comprising from about 10 to about 70 weight percent silica and from about 90 to about 30 weight percent of a partially polymerized organic silanol of the formula $RSi(OH)_3$, wherein R is selected from methyl and up to about 40% of a group selected from the group consisting of vinyl, phenyl, gamma-glycidoxypropyl, and gamma-methacryloxypropyl, and
(b) from about 95 to about 50 weight percent solvent, the solvent comprising from about 10 to about 90 weight percent water and from about 90 to about 10 weight percent lower aliphatic alcohol,
wherein the coating composition has a pH of from about 3.0 to about 8.0.

18. The method according to claim 1, wherein a coating is derived from a thermally-curable composition comprising an epoxy resin and silica particles.

19. The method according to claim 1, wherein a coating is derived from a composition comprising a cross-linkable organic polymer selected from a polyethylene imine (PEI), polyester and polyvinylalcohol (PVOH), and further comprising a cross-linking agent.

20. The method according to claim 1, wherein said coating layer has a dry thickness of from 1 to 20 microns.

* * * * *

UNITED STATES PATENT AND TRADEMARK OFFICE
CERTIFICATE OF CORRECTION

PATENT NO. : 8,591,998 B2  Page 1 of 1
APPLICATION NO. : 12/278820
DATED : November 26, 2013
INVENTOR(S) : MacKerron et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1416 days.

Signed and Sealed this
Twenty-second Day of September, 2015

Michelle K. Lee
*Director of the United States Patent and Trademark Office*